Jan. 9, 1940. E. R. WOLFERT 2,186,224
HEAT EXCHANGE APPARATUS
Filed Dec. 31, 1937 3 Sheets-Sheet 1
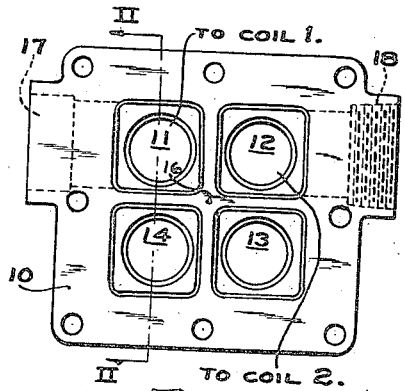
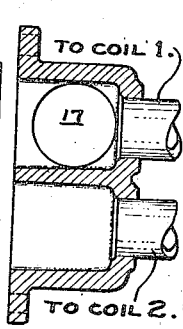
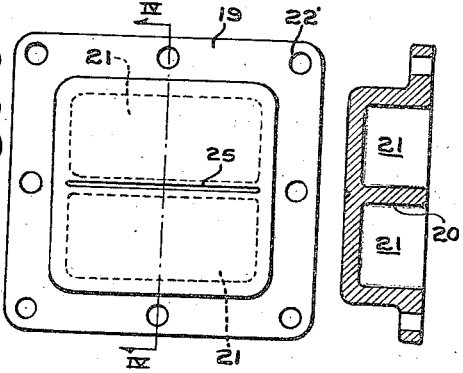
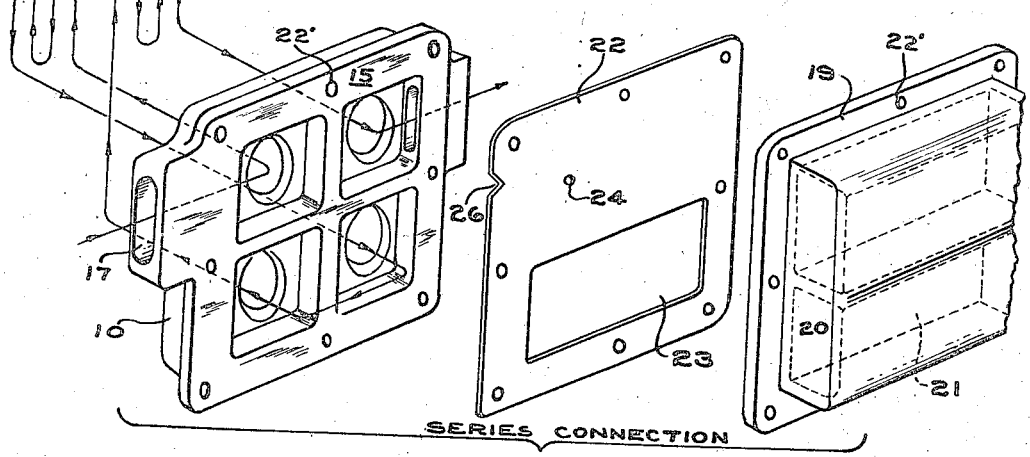
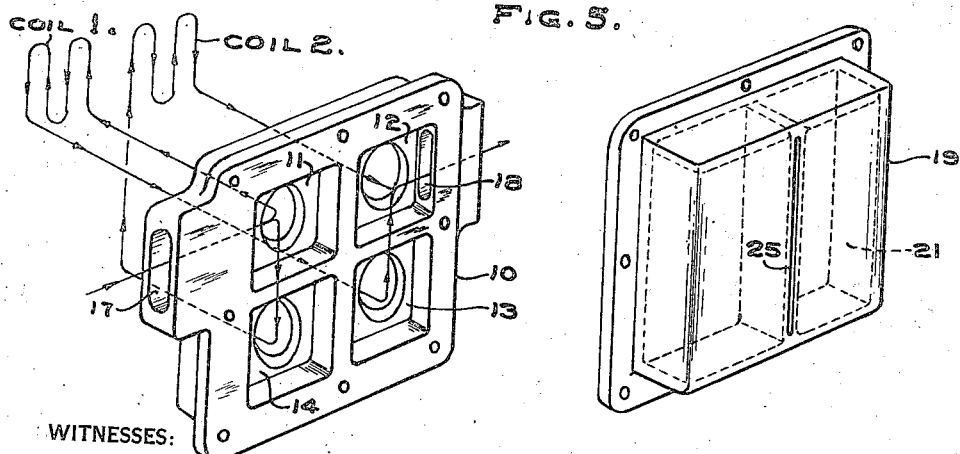
WITNESSES:
N. J. Eisinger
Fred Dunderdale
INVENTOR
EDWARD R. WOLFERT.
BY
ATTORNEY Jan. 9, 1940.  E. R. WOLFERT  2,186,224
HEAT EXCHANGE APPARATUS
Filed Dec. 31, 1937  3 Sheets-Sheet 3
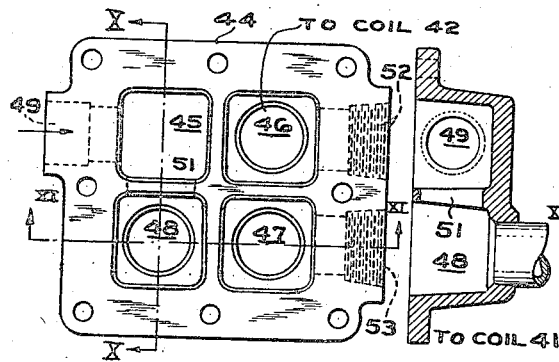
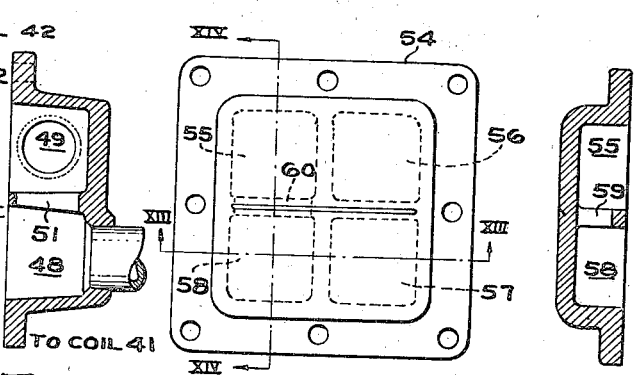
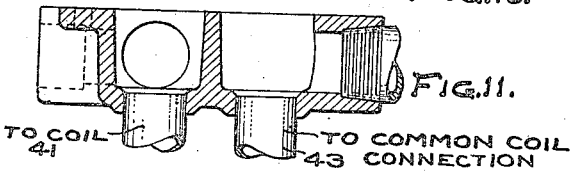
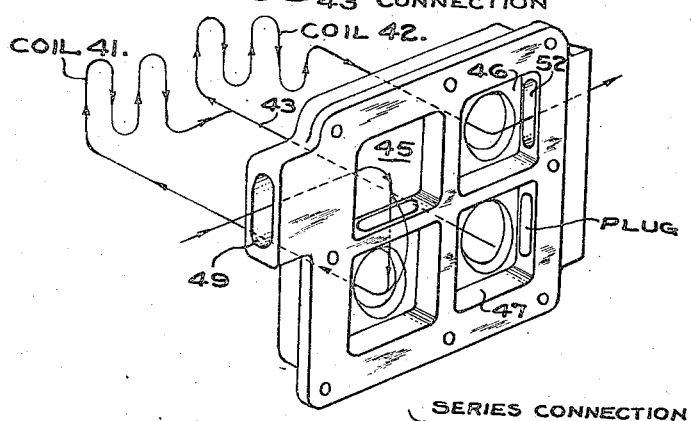
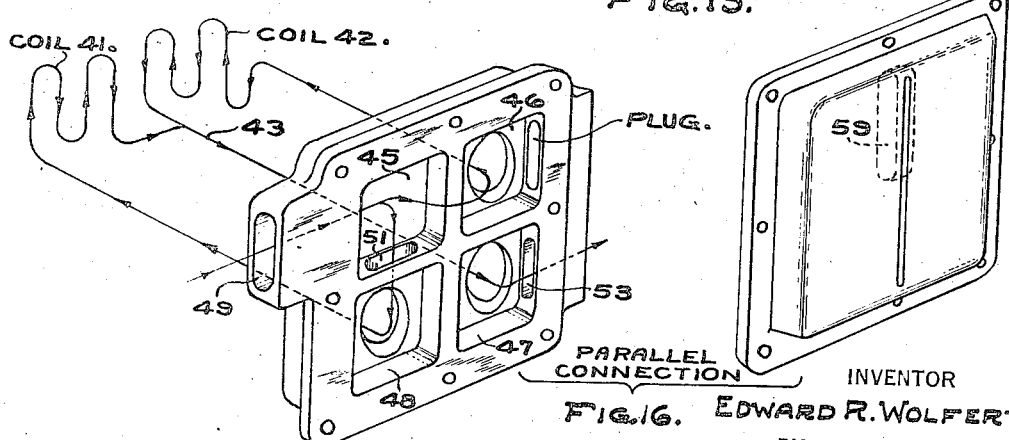
INVENTOR
EDWARD R. WOLFERT.
BY
ATTORNEY Patented Jan. 9, 1940

2,186,224

UNITED STATES PATENT OFFICE 2,186,224

HEAT EXCHANGE APPARATUS

Edward R. Wolfert, Springfield, Mass., assignor to Westinghouse Electric & Manufacturing Company, East Pittsburgh, Pa., a corporation of Pennsylvania Application December 31, 1937, Serial No. 182,662

13 Claims. (Cl. 137—111)

My invention relates to heat exchange apparatus, more particularly to a manifold whereby either series or parallel flow through a plurality of passages of the heat exchanger may be provided, and it has an object to provide improved apparatus.

A further object is to provide a standard form of apparatus adapted for different conditions of flow through the heat exchange apparatus.

The present invention is of particular utility in connection with a water cooled refrigerant condenser. When relatively cool city water is used, it is desirable to provide a relatively long flow path thereof in order to take full advantage of the city water pressure and the great temperature rise of the water, that is, to use high velocity of the water to obtain the best heat transfer rate. However, when a cooling tower is used, large quantities of water must be circulated in order to use the cooling tower to best advantage. In such a case, a shorter flow path of greater flow area is desirable in order to reduce the pumping load.

In accordance with my invention, I provide a manifold having several chambers which are connected to the heat transfer passages and which are formed with openings adapted to be closed by a cover. The construction and arrangement is such, as hereinafter fully described, that the passages may be connected either in series or in parallel, this selection being effected primarily by merely changing the position of the cover on the manifold.

The above and other objects are effected by my invention as will be apparent from the following description and claims taken in connection with the accompanying drawings, forming a part of this application, in which:

Fig. 1 is a front elevation of the body of the manifold;

Fig. 2 is a cross section thereof taken on the line II—II of Fig. 1;

Fig. 3 is a front elevation of the cover;

Fig. 4 is a cross section thereof taken on the line IV—IV of Fig. 3;

Fig. 5 is an exploded view showing the parts in angular relation to provide series connection;

Fig. 6 is a similar view showing the parts in angular relation for parallel connection;

Fig. 9 is a front elevation of the manifold body of another modification;

Figs. 10 and 11 are cross-sectional views taken on the lines X—X and XI—XI of Fig. 9;

Fig. 12 is a front elevation of the cover for the manifold body of Fig. 9;

Figs. 13 and 14 are cross-sectional views taken on the lines XIII—XIII and XIV—XIV of Fig. 12;

Fig. 15 is an exploded view of the manifold of Figs. 9 to 14, the parts being arranged in angular relation for series connection; and Fig. 16 is a similar view showing the parts in angular relation for parallel connection.

Figure 7:
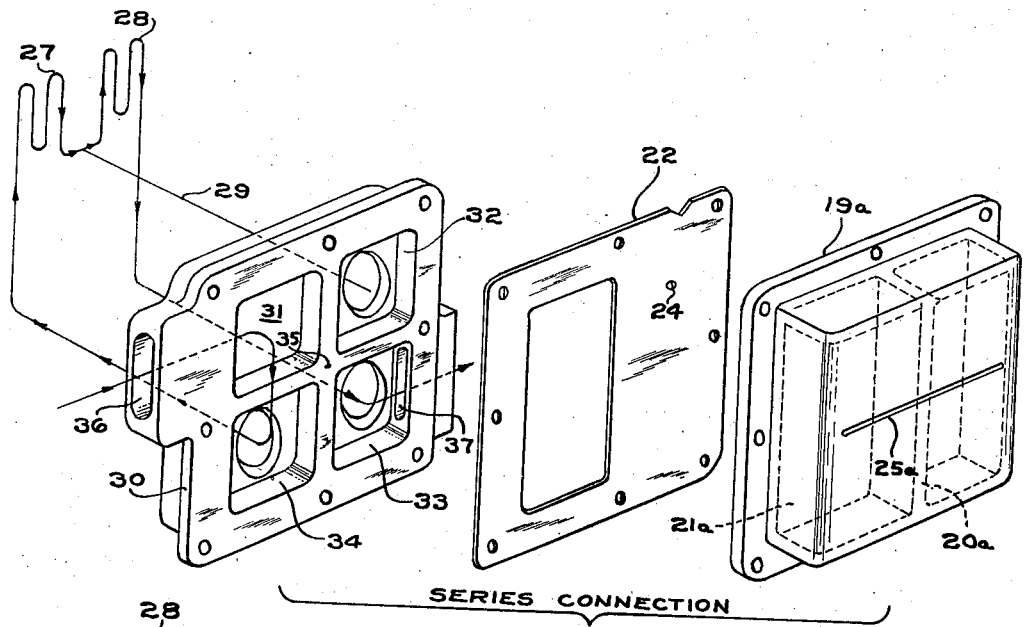
Fig. 7 is an exploded view of a modified form of manifold, the parts being arranged in angular relation for series connection.

Referring first to the embodiment shown in Figs. 1 to 6, a manifold body 10, which is generally square in form, is formed with first, second, third and fourth chambers 11, 12, 13 and 14 which open into the front face or surface 15 of the manifold body. As is clearly shown on the drawings, the open faces of these chambers are arranged equiangularly and similarly about a central point 16. The first chamber 11 is formed with an inlet connection 17, and the second chamber 12 is formed with an outlet connection 18.

The opposite ends of one coil 1 are connected to the diagonally opposite manifolds 11 and 13, and the opposite ends of a second coil, 2, are connected to the diagonally opposite chambers 12 and 14. The coils 1 and 2, may, for example, convey cooling water in heat transfer relation to refrigerant vapor for condensing the latter. Inasmuch as the present invention relates merely to structure for selectively connecting the coils 1 and 2 either in series or in parallel, it is not necessary to consider the coils themselves any further.

The manifold is provided with a cover member 19, which is square in form and which is formed with two recesses 21 separated by a partition 20. Each of these recesses is arranged to register with two of the chambers, 11 to 14, in the body member 10. The body member 10 and the cover member 19 are formed with registering bolt openings 22' whereby they may be clamped together.

To provide for series connection, the cover member 19 is positioned with the recesses 21 extending horizontally, that is, with one recess registering with the open faces of the chambers 11 and 12 and with the other recesses registering with the open faces of the chambers 13 and 14. For the series connection, suitable provision is made for shutting off communication between the chambers 11 and 12, which would otherwise be permitted by the upper recess 21 and which would short-circuit fluid directly from the inlet to the outlet. For this purpose I prefer to employ a plate 22, of the form shown in Fig. 5, which forms a wall between the upper recess 21 and the outlet chamber 12. The plate 22 has an opening 23 which permits free communication between the chambers 13 and 14 and the lower recess 21. An opening 24 may be formed in the plate 22, in order to equalize the pressures in the chamber 11 and the upper recess 21.

The cover member 19 is bolted to the body member 10 with the plate 22 clamped therebetween. Fluid entering through the inlet 17 may now flow through the chamber 11, the coil 1, the chamber 13, the lower recess 21, the chamber 14, the coil 2 and the chamber 12 to the outlet 18. The coils are, therefore, connected in series.

When it is desired to connect the coils in parallel, the cover member 19 is rotated 90° in either direction and bolted to the body member 10. The recesses 21 are now disposed vertically, one of the recesses providing communication between the chambers 11 and 14 and the other providing communication between the chambers 12 and 13. The plate 22 is omitted.

Fluid may now flow through the coils in parallel as follows: The flow through the coil 1 extends from the inlet 17 through the chamber 11, the coil 1, the chamber 13, the right hand recess 21, the chamber 12 to the outlet 18. The flow through the coil 2 extends from the inlet 17, the chamber 11, the left hand recess 21, the chamber 14, the coil 2, the chamber 12 and the outlet 18.

The cover member 19 is preferably provided with a slot 25, which indicates, when in horizontal position, that the manifold is arranged for series connection and which indicates, when in vertical position, that the manifold is arranged for parallel connection. A notch 26 may be provided in the plate 22 to indicate whether it is in proper position.

Figure 8:
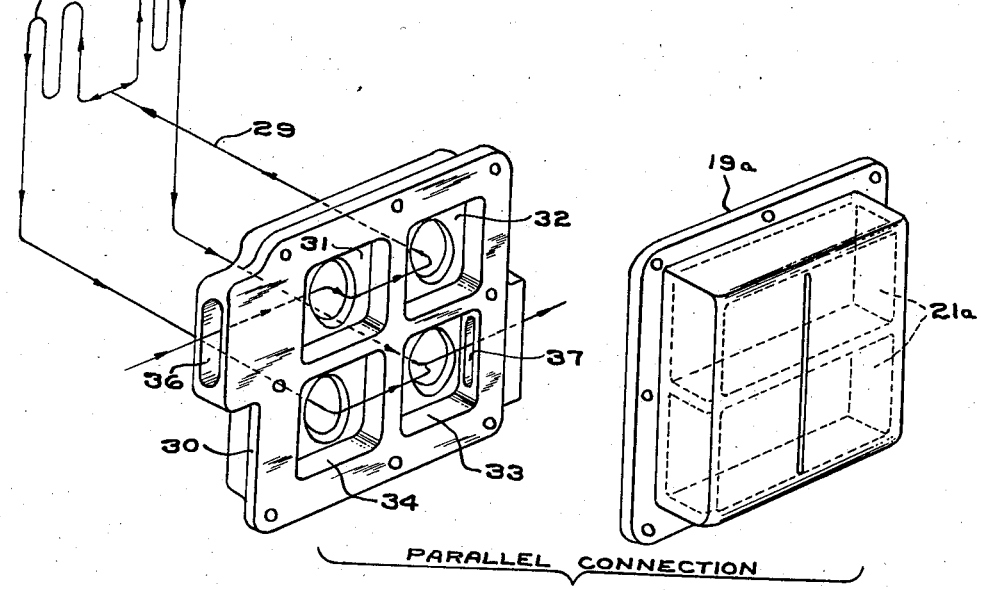
Fig. 8 is a similar view showing the parts in angular relation for parallel connection.

The embodiment shown in Figs. 7 and 8, while generally very similar to that shown in Figs. 1 to 6, is particularly suited where it is desired to provide a common connection between the manifold and each of the coils 27 and 28, such common connection being indicated at 29. The body member 30 is again square in general outline and is formed with chambers 31, 32, 33 and 34, having open faces, arranged equiangularly and similarly about a center 35, as in the first embodiment. In this embodiment, however, the diagonally opposite chambers 31 and 33 are provided with the inlet 36 and the outlet 37, respectively. The chamber 32 is connected to one end of each of the coils 27 and 28 through the connection 29. The opposite end of the coil 27 is connected to the chamber 34 and the opposite end of the coil 28 is connected to the chamber 33.

The cover member 19a is similar to the cover member 19 except that the slot 25a extends transversely of the partition 20a for the reason that series connection is provided in this embodiment with the partition 20a and the recesses 21a extending vertically.

To provide for series connection, the cover 19a is angularly disposed as shown in Fig. 7 and a plate 22, similar to that shown in Fig. 5, is inserted therebetween in the position shown in Fig. 7. The cover 19a is bolted to the body member 30 with the plate 22 clamped therebetween. The manifold is now arranged for series connection. The left hand recess 21a in the cover member provides communication between the chambers 31 and 34 while the plate 22 cuts off communication between the chambers 32 and 33. The flow through the coils 27 and 28 is now as follows: From the inlet 36 through the chamber 31, the left hand recess 21a, the chamber 34, the coil 27, the coil 28, and the chamber 33, to the outlet 37. The fluid within the connection 29 remains in static condition.

To provide parallel connection of the coils 27 and 28, the plate 22 is discarded and the cover 19a is rotated 90° to bring it to the angular position shown in Fig. 8. It is then bolted to the body member 30. The recesses 21a now extend horizontally, the upper recess connecting the chambers 31 and 32 and the lower recess connecting the chambers 33 and 34.

The flow of fluid through the two coils 27 and 28 extends in common from the inlet 36 through the chamber 31, the upper recess 21a, the chamber 32 and the connection 29. It then divides, one portion going through the coil 27, the chamber 34 and the lower recess 21a to the chamber 33, while the other portion goes through the coil 28 directly to the chamber 33. In the latter, the two streams are again united and are discharged through the outlet 37.

While the plate 22 constitutes a simple and expedient means of cutting off flow through one of the recesses in the cover for series connection, it will be apparent that other suitable expedients may be used.

Suitable gaskets may be used between the several parts of the manifold, as is well understood in the art.

From the above decription, it will be apparent that I have provided a simple structure whereby either series or parallel connection of two passages may be provided by merely changing the angular position of the cover member, together with the provision of some means for shutting off flow through one of the recesses in the cover member for series connection.

A particular advantage of this construction is that the same apparatus may be supplied and carried in stock for different types of installation. It is preferably supplied in condition for series connection. When it is desired to use it for a parallel connection it is merely necessary to remove the plate 22 and to turn the cover through an angle of 90°.

In Figs. 9 to 16, I show another embodiment which is also suitable where there is a common connection between the manifold and each of the coils, 41 and 42, such common connection being indicated at 43. There is no plate required between the body member and the cover member, but there are two outlet openings for series and parallel connection, respectively. The body member 44 is formed with chambers 45, 46, 47 and 48, having open faces and arranged equiangularly and similarly about a center, as in the other embodiments. The chamber 45 has an inlet 49, and is in permenent communication with the chamber 48 through an opening 51. The chamber 46 is provided with an outlet 52 used for series connection, and the chamber 47 is provided with an outlet 53 used for parallel connection. The chamber 47 is connected to one end of each of the coils 41 and 42 through the common connection 43. The opposite end of the coil 41 is connected to the chamber 48 and the opposite end of the coil 42 is connected to the chamber 46.

The cover member 54 is formed with four recesses 55 to 58, the recesses 55 and 58 being in permenent communication through a connecting opening 59 so as to constitute in effect a common recess. It is preferably provided with a slot 60 which indicates, when disposed horizontally, that the cover member is arranged for series connection, and when arranged vertically that the cover member is arranged for parallel connection. To provide for series connection, the cover member 54 is angularly disposed as shown in Figs. 12 and 15. The outlet 53 of the chamber 47 is closed as by inserting a plug therein and the conduit which is to receive the discharged water is connected to the outlet 52 of the chamber 46. The flow of water through the coils 41 and 42 is now as follows: From the inlet 49 to the chamber 45, then to the chamber 48 through the opening 51 and also through the chambers 55 and 58 and the opening 59 in the cover member 54, then through the coils 41 and 42 in series, and through the chamber 46 to the outlet 52. The chambers 46 and 47 are covered by the recesses 56 and 57 of the cover member, and there is no flow through the common connection 43.

To provide parallel connection of the coils 41 and 42, a plug is inserted in the outlet 52 to close the same, and the conduit for receiving the discharged water is connected to the outlet 53. The cover member 54 is rotated 90° to the right to the position shown in Fig. 16. The chambers 45 and 46 are placed in communication through the recesses 55 and 58 and the opening 59 in the cover member.

The water flowing through the coils 41 and 42 enters through the inlet 49 and divides in the chamber 45, one portion flowing through the opening 51, the chamber 48 and the coil 41 to the common connection 43, while the other portion flows through the recesses 55 and 58 and the opening 59 to the chamber 46, then through the coil 42 to the common connection 43. From the latter the two streams flow in parallel through the chamber 47 to the outlet 53.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. A manifold for a heat exchanger having first and second fluid passages, said manifold having chambers communicating with the opposite ends of said passages, one chamber having an inlet connection and a second chamber having an outlet connection for fluid circulated through said passages, a plurality of said chambers having openings, and cover means for closing said openings, said openings and cover means being constructed and arranged so that the cover means may be mounted in either one of two positions and so as to connect said passages in series in one position of said cover means and to connect the same in parallel in a second position of said cover means.

2. In heat transfer apparatus, the combination of first and second fluid passages, a manifold comprising four chambers having openings arranged equi-angularly and similarly about a center, one of said chambers having an inlet and another having an outlet, each of said fluid passages having its opposite ends connected to two of said chambers, a cover having two recesses each adapted to register with two adjacent chambers in each of two positions of the cover, said cover being movable from one position to the other by movement of 90° about said center, and means for selectively cutting off communication between the two chambers registering with one of said recesses in the cover, said inlet, said outlet and the connections between the fluid passages and the chambers being so arranged that, with the cover in one position and communication between said last-mentioned two chambers cut off, the fluid passages are connected in series between said inlet and said outlet and, with the cover in the other position and with said last-mentioned two chambers in communication, the fluid passages are connected in parallel between said inlet and said outlet.

3. In heat transfer apparatus, the combination of first and second fluid passages, a manifold comprising four chambers having openings arranged equi-angularly and similarly about a center, one of said chambers having an inlet and another having an outlet, each of said fluid passages having its opposite ends connected to two of said chambers, a cover having two recesses each adapted to register with two adjacent chambers in each of two positions of the cover, said cover being movable from one position to the other by movement of 90° about said center, and a plate adapted to be inserted between said manifold and said cover to cut off communication between two adjacent chambers of the manifold, said inlet, said outlet and the connections between the fluid passages and the chambers being so arranged that, with the cover in one position and said plate inserted, the fluid passages are connected in series between said inlet and said outlet and, with the cover in the other position and the plate removed, the fluid passages are connected in parallel between said inlet and said outlet.

4. A manifold for heat transfer apparatus having first and second fluid passages, said manifold comprising first, second, third and fourth chambers having openings disposed equi-angularly and similarly about a center in the order named, said first and second chambers having inlet and outlet connections, respectively, said first and third chambers being connected to the opposite ends of said first fluid passage and said second and fourth fluid passages being connected to the opposite ends of said second fluid passage, said chambers having openings arranged similarly about a center in the order named, a cover for said openings, said cover having two recesses each adapted to cover a pair of adjacent chamber openings and to provide communication therebetween, and said cover being adapted to be rotated 90° so that each recess covers a different pair of chamber openings.

5. A manifold for heat transfer apparatus having first and second fluid passages, said manifold comprising first, second, third and fourth chambers having openings disposed equi-angularly and similarly about a center in the order named, said first and second chambers having inlet and outlet connections, respectively, said first and third chambers being connected to the opposite ends of said first fluid passage and said second and fourth fluid passages being connected to the opposite ends of said second fluid passage, a cover for said openings, said cover having two recesses each adapted to cover a pair of adjacent chamber openings and to provide communication therebetween, and said cover being adapted to be rotated 90° so that each recess covers a different pair of chambers chamber openings, and means for selectively closing off communication through one of said recesses in the cover.

6. In heat transfer apparatus, the combination of first and second fluid passages, a manifold comprising four chambers having openings arranged equi-angularly and similarly about a center, two adjacent chambers having an inlet and an outlet, respectively, said first passage having its ends connected to diagonally opposite chambers and said second passage having its ends connected to the other diagonally opposite chambers, a cover having a chamber adapted, in one position of the cover, to register with the two adjacent chambers having the inlet and the outlet and a second chamber registering with the other two adjacent chambers in the manifold, a removable plate adapted to be inserted between said manifold and said cover to cut off communication between the chambers having the inlet and the outlet, whereby said fluid passages are connected in series between said inlet and said outlet, said cover being adapted to be moved to a second position by rotation through 90° about said center and, with said plate removed, to provide connection of said fluid passages in parallel between said inlet and said outlet.

7. In heat transfer apparatus, the combination of first and second fluid passages, a manifold comprising four chambers having openings arranged equi-angularly and similarly about a center, two adjacent chambers having an inlet and outlet respectively, said first and second passages having their opposite ends connected to diagonally opposite chambers, a cover having two recesses each adapted to register with two adjacent chamber openings, and a removable plate adapted to shut off communication between the chambers having the inlet and the outlet when both register with the same chamber in the cover.

8. In a heat transfer unit, the combination of first and second fluid passages, a manifold comprising four chambers having openings arranged equi-angularly and similarly about a center, diagonally opposite chambers having an inlet and an outlet respectively, said first fluid passage having its opposite ends connected to the other diagonally opposite chambers, said second fluid passage having its opposite ends connected to two adjacent chambers, a cover having two chambers each adapted to register with two adjacent chambers in each of two positions of the cover, said cover being movable from one position to the other by movement of 90° about said center, and a removable plate adapted to shut off communication between the two adjacent chambers to which the ends of said second fluid passage are connected, whereby, with the cover in one position and the plate in place, said fluid passages are connected in series and, with the cover in the other position and the plate removed, said fluid passages are connected in parallel.

9. In heat transfer apparatus, the combination of first and second fluid passages, a manifold comprising four chambers having openings arranged equi-angularly and similarly about a center, one of said chambers having an inlet and another having an outlet, each of said fluid passages having its ends connected to two of said chambers, a cover having two chambers each adapted to register with two adjacent chambers in each of two positions of the cover, said cover being movable from one position to the other by movement of 90° about said center, and a plate adapted to be inserted between said manifold and said cover to cut off communication between two adjacent chambers of the manifold, said inlet, said outlet and the connections between the fluid passages and the chambers being so arranged that, with the cover in one position and said plate inserted, the fluid passages are connected in series between said inlet and said outlet and, with the cover in the other position and the plate removed, the fluid passages are connected in parallel between said inlet and said outlet.

10. A manifold for a heat exchanger or the like having first and second fluid passages, said manifold comprising four chambers having openings arranged equi-angularly and similarly about a center, each of said fluid passages having its opposite ends connected to two of said chambers, cover means for said openings including a cover having a recess adapted to register with two adjacent chambers in each of two positions of the cover, said manifold and said cover means being so arranged that, in one position of the cover, said passages are connected in parallel and in a second position thereof, said passages are connected in series.

11. A manifold for a heat exchanger or the like having first and second fluid passages, said manifold having chambers communicating respectively with the several ends of said passages, each of said chambers having an opening, and a cover for all of said openings, said cover having a recess therein adapted to provide communication between two of said chambers, said manifold and cover being so arranged that, in one position thereof, said passages are arranged in parallel and in a second position thereof, said passages are arranged in series.

12. A manifold for a heat exchanger or the like having first and second fluid passages, said manifold having a chamber for each end of each of said passages, each chamber opening into an exterior face of said manifold, a cover for said manifold covering said openings and having a recess for selectively providing communication between two of said chambers to selectively provide series or parallel flow of fluid through said passages.

13. A manifold for a heat exchanger or the like having two fluid passages, said manifold comprising four chambers having openings arranged equi-angularly and similarly about a center and at least three of said chambers having openings adapted to communicate with the ends of said fluid passages, a cover having two recesses each adapted to register with two adjacent chambers in each of two positions of the cover, said cover being movable from one position to the other by angular movement about said center, and means for selectively cutting off communication between the two chambers registering with one of said recesses in the cover in one position of the cover.

EDWARD R. WOLFERT.